United States Patent [19]

Agari et al.

[11] Patent Number: 5,965,672
[45] Date of Patent: Oct. 12, 1999

[54] CURED MATERIALS OF UNSATURATED POLYESTER RESIN

[75] Inventors: Yasuyuki Agari; Masayuki Shimada; Akira Ueda, all of Osaka; Hideo Takeuchi, Saitama; Nobutaka Shimamura, Saitama, all of Japan

[73] Assignees: Osaka Municipal Government; Wako Pure Chemical Industries, Ltd., both of Osaka, Japan

[21] Appl. No.: 08/921,240

[22] Filed: Aug. 29, 1997

[30] Foreign Application Priority Data

Sep. 2, 1996 [JP] Japan ..................................... 8-252488

[51] Int. Cl.⁶ ..................................................... C08F 20/00
[52] U.S. Cl. ........................................... 525/446; 525/474
[58] Field of Search ..................................... 525/446, 474

[56] References Cited

U.S. PATENT DOCUMENTS

| | | | |
|---|---|---|---|
| 3,890,294 | 6/1975 | Sheppard et al. | 260/94.7 N |
| 5,141,915 | 8/1992 | Roenigk et al. | 503/227 |
| 5,627,130 | 5/1997 | Bailey et al. | 503/227 |
| 5,723,271 | 3/1998 | Smith et al. | 430/517 |
| 5,760,136 | 6/1998 | Kato et al. | 525/100 |

FOREIGN PATENT DOCUMENTS

| | | |
|---|---|---|
| 0 335 406 | 10/1989 | European Pat. Off. . |
| 0 418 913 | 3/1991 | European Pat. Off. . |

OTHER PUBLICATIONS

Patent Abstracts of Japan, vol. 018, No. 361, Jul. 7, 1994 (JP 06 093100).
Patent Abstracts of Japan, vol. 095, No. 002, Mar. 31, 1995 (JP 06 322089).
Derwent WPI Abstract of JP 1–141905 (Jun. 2, 1989).
Derwent WPI Abstract of JP 1–254778 (Oct. 11, 1989).
Derwent WPI Abstract of JP 1–254774 (Oct. 11, 1989).
Derwent WPI Abstract of JP 4–033908 (Feb. 5, 1992).
Derwent WPI Abstract of JP 4–039315 (Feb. 10, 1992).
Derwent WPI Abstract of JP 7–102210 (Apr. 18, 1995).
Derwent WPI Abstract of JP 7–041582 (Feb. 10, 1995).
Derwent WPI Abstract of JP 1–230604 (Sep. 14, 1989).
Derwent WPI Abstract of JP 1–138207 (May 31, 1989).
Derwent WPI Abstract of JP 1–245066 (Sep. 29, 1989).
Derwent WPI Abstract of JP 4–372675 (Dec. 25, 1992).
Derwent WPI Abstract of JP 6–093100 (Apr. 5, 1994).
Derwent WPI Abstract of JP 6–322089 (Nov. 22, 1994).
Derwent WPI Abstract of JP 6–182780 (Jul. 5, 1994).
Derwent WPI Abstract of JP 1–254775 (Oct. 11, 1989).
Derwent WPI Abstract of JP 4–279616 (Oct. 5, 1992).
Derwent WPI Abstract of JP 4–089808 (Mar. 24, 1992).
Derwent WPI Abstract of JP 1–252611 (Oct. 9, 1989).
Derwent WPI Abstract of JP 4–008702 (Jan. 13, 1992).

*Primary Examiner*—Margaret W. Glass
*Attorney, Agent, or Firm*—Armstrong, Westerman, Hattori, McLeland & Naughton

[57] ABSTRACT

An unsaturated polyester resin composition contains a silicone-containing macro-azo-initiator and/or a silicone-containing block copolymer obtained by copolymerizing the silicone-containing macro-azo-initiator with a nonionic monomer.

8 Claims, No Drawings

CURED MATERIALS OF UNSATURATED POLYESTER RESIN

BACKGROUND OF THE INVENTION

The present invention relates to a novel polyester resin which is excellent in water-repellent ability, weathering resistance, chemical resistance, anti-staining ability, adhesive force and the like.

Unsaturated polyester resin has been used in artificial marble, button and decorative boards. Further, so-called FRP has high value as reinforced plastics. FRP is manufactured by impregnating fiber, etc. with unsaturated polyester resin. FRP has high mechanical strength and can be used in processing of a large scale molded article, and by this reason, FRP has generally been utilized in building materials such as corrugated plate and water pipe, housing materials such as a bath tub and a cleaning bath, parts of ships, automobiles and airplanes, and so on. However, FRP is still accompanied with such defects as insufficient chemical resistance and salt resistance and high water-absorbability. Further FRP has a problem in its anti-staining ability. For instance, the FRP when used in a water bath and tank, tends to be stained with scale, and therefore the gloss of the products has to be improved by finishing of a mold to be used when FRP is used in dressers and table tops wherein the appearance of the products is important and in such cases, a repellent agent has to be applied on a mold in molding process and thus even in a case of SMC (sheet molding compound), an internal repellent agent such as repelling film has to be used.

SUMMARY OF THE INVENTION

The present invention has been established under such circumstances as mentioned above and the object of the present invention is to provide novel cured materials of unsaturated polyester resin containing a siloxane part on their surface layer, which are excellent in water-repellent ability, weathering resistance, chemical resistance, anti-staining ability, adhesive force and the like.

The present invention provides an unsaturated polyester resin composition, which contains a silicone-containing macro-azo-initiator shown by the general

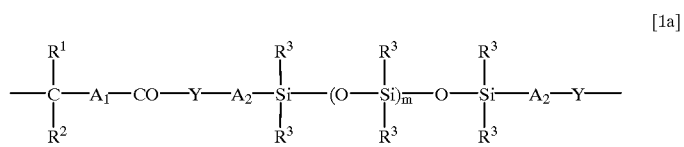

(wherein $R^1$ is a lower alkyl group; $R^2$ is a lower alkyl group or a cyano group; $A_1$ is an alkylene group which may contain one or more oxygen atom(s); $R^3$ is a lower alkyl group or a phenyl group; $A_2$ is a lower alkylene group which may contain one or more oxygen atom(s) and/or aromatic ring(s); Y is —NH— or —O—; m is 0 or a natural number; and n is a natural number) and/or a silicone-containing block copolymer having a repeating unit shown by the general formula [1a]:

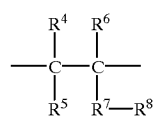

(wherein $R^1$, $R^2$, $R^3$, $A_1$, $A_2$, Y, and m are as defined above) and a repeating unit shown by the general formula [2a]:

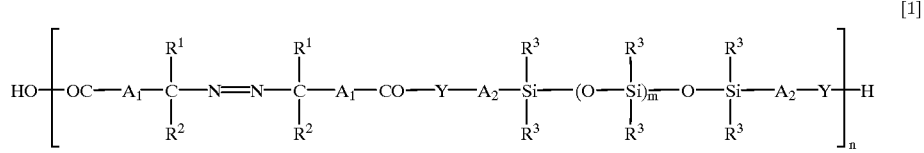

(wherein $R^4$ is a hydrogen atom, a lower alkyl group or a halogen atom; $R^5$ is a hydrogen atom, a lower alkyl group, a halogen atom, an alkyloxycarbonyl group or a formyl group; $R^6$ is a hydrogen atom, a lower alkyl group, a halogen atom or an alkyloxycarbonyl group; $R^7$ is an alkylene group which may optionally contain double bond(s) or a direct link; and $R^8$ is a hydrogen atom, an alkyl group, a haloalkyl group, an aryl group which may have substituent(s), a halogen atom, an alkyloxycarbonyl group, an aralkyloxycarbonyl group, a hydroxyalkyloxycarbonyl group, an aryloxycarbonyl group, a cyano group, an acyloxy group, a formyl group or a hydroxyl group).

The present invention also provides an unsaturated polyester resin composition mentioned above, wherein the silicone-containing block copolymer is one obtained by copolymerizing a silicone-containing macro-azo-initiator shown by the above-mentioned general formula [1] with a nonionic monomer shown by the general formula [2]:

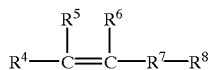

(wherein $R^4$ through $R^8$ as defined above).

The present invention further provides a method for preparation of cured materials of unsaturated polyester resin containing a siloxane part on their surface layer, which comprises curing the unsaturated polyester resin composition mentioned above.

The present invention further provides a method for preparation of cured materials of unsaturated polyester resin containing a siloxane part on their surface layer, which comprises allowing unsaturated polyester resin to contact with a silicone-containing macro-azo-initiator shown by the above-mentioned general formula [1] and/or a silicone-containing block copolymer having a repeating unit shown by the above-mentioned general formula [1a] and a repeating unit shown by the above-mentioned general formula [2a].

The present invention also provides a method for preparation of cured materials of unsaturated polyester resin containing a siloxane part on their surface layer, which comprises allowing the surface of unsaturated polyester resin to contact with a silicone-containing macro-azo-initiator shown by the above-mentioned general formula [1] and/or a silicone-containing block copolymer having a repeating unit shown by the above-mentioned general formula [1a] and a repeating unit shown by the above-mentioned general formula [2a] before a curing reaction is completed in the process of curing reaction, followed by proceeding the curing reaction to completion.

The present invention further provides a method mentioned above, wherein the silicone-containing block copolymer is one obtained by copolymerizing a silicone-containing macro-azo-initiator shown by the above-mentioned general formula [1] with a nonionic monomer shown by the above-mentioned general formula [2].

The present invention further provides cured materials of unsaturated polyester resin, which contain a siloxane part of a silicone-containing compound having a repeating unit shown by the above-mentioned general formula [1a] predominantly on their surface layer.

DESCRIPTION OF THE PREFERRED EMBODIMENTS

The silicone-containing macro-azo-initiator used in the present invention is shown by the following general formula [1]:

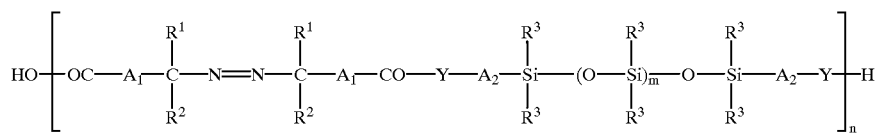

(wherein $R^1$ is a lower alkyl group; $R^2$ is a lower alkyl group or a cyano group; $A_1$ is an alkylene group which may contain one or more oxygen atom(s); $R^3$ is a lower alkyl group or a phenyl group; $A_2$ is a lower alkylene group which may contain one or more oxygen atom(s) and/or aromatic ring(s); Y is —NH— or —O—; m is 0 or a natural number; and n is a natural number).

The silicone-containing block copolymer of the present invention includes one comprising a polysiloxane segment shown by the formula [1a]

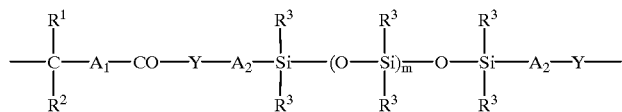

(wherein $R^1$, $R^2$, $R^3$, $A_1$, $A_2$, Y, and m are as defined above) which is derived from the silicone-containing macro-azo-initiator of the general formula [1] and a nonionic monomer unit shown by the formula [2a]

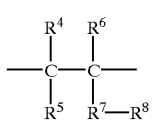

(wherein $R^4$ through $R^8$ as defined above) which is derived from the nonionic monomer of the general formula [2].

The silicone-containing block copolymer used in the present invention can be obtained by copolymerizing the silicone-containing macro-azo-initiator shown by the above general formula [1] with a nonionic monomer shown, for example, by the general formula [2]

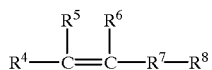

[2]

(wherein $R^4$ is a hydrogen atom, a lower alkyl group or a halogen atom; $R^5$ is a hydrogen atom, a lower alkyl group, a halogen atom, an alkyloxycarbonyl group or a formyl group; $R^6$ is a hydrogen atom, a lower alkyl group, a halogen atom or an alkyloxycarbonyl group; $R^7$ is an alkylene group which may optionally contain double bond(s) or a direct link; and $R^8$ is a hydrogen atom, an alkyl group, a haloalkyl group, an aryl group which may have substituent(s), a halogen atom, an alkyloxycarbonyl group, an aralkyloxycarbonyl group, a hydroxyalkyloxycarbonyl group, an aryloxycarbonyl group, a cyano group, an acyloxy group, a formyl group or a hydroxyl group).

In the general formula [1] and [1a], the lower alkyl group shown by $R^1$, $R^2$ and $R^3$ may be straight chain, branched chain or cyclic lower alkyl groups, of which examples are lower alkyl groups having 1 to 6 carbon atoms. Specific examples of the lower alkyl group are groups such as methyl, ethyl, n-propyl, isopropyl, n-butyl, isobutyl, tert-butyl, sec-butyl, n-pentyl, isopentyl, neopentyl, tert-pentyl, 3,3-dimethylbutyl, 1,1-dimethylbutyl, 1-methylpentyl, n-hexyl, isohexyl, cyclopropyl, cyclopentyl, cyclohexyl, etc. The lower alkylene group shown by $A_1$ which may contain one or more oxygen atom(s) is straight chain or branched chain lower alkylene groups, of which examples are alkylene groups having 1 to 6 carbon atoms. When said lower alkylene group contains one or more oxygen atom(s), lower alkylene groups having —O— group in a number of one or more, preferably 1 to 5, more preferably 1 to 3, at one end or both ends of the alkylene group (or chain) or at any position in the alkylene chain can be referred to. Specific examples of the lower alkylene group are groups such as methylene, ethylene, propylene, butylene, 2-methylpropylene, pentylene, 2,2-dimethylpropylene, 2-ethylpropylene, hexylene, —O—CH$_2$—, —O—CH$_2$CH$_2$—, —CH$_2$—O—CH$_2$—, —CH$_2$CH$_2$—O—CH$_2$—, —CH$_2$CH$_2$—O—CH$_2$CH$_2$—, —CH$_2$CH$_2$—O—CH$_2$CH$_2$—O—CH$_2$CH$_2$—, etc. The alkylene group shown by $A_2$ which may contain one or more oxygen atom(s) and/or an aromatic ring(s) is straight chain, branched chain or cyclic alkylene groups, of which examples are alkylene groups having 1 to 10 carbon atoms. When said alkylene group contains one or more oxygen atom(s), alkylene groups having —O— group in a number of one or more, preferably 1 to 5, more preferably 1 to 3, at one end or both ends of the alkylene group (or chain) or at any position in the alkylene chain can be referred to. When said alkylene group has an aromatic ring(s), alkylene groups having an aromatic ring(s) such as a phenylene group, a diphenylene group or the like, at one end or both ends or in the alkylene chain can be referred to. Specific examples of the alkylene group are groups such as methylene, ethylene, propylene, butylene, 2-methylpropylene, pentylene, 2,2-dimethylpropylene, 2-ethylpropylene, hexylene, heptylene, octylene, 2-ethylhexylene, nonylene, decylene, cyclopropylene, cyclopentylene, cyclohexylene, —CH$_2$—C$_6$H$_4$—, o-xylen-α,α'-diyl, —O—CH$_2$—, —O—CH$_2$CH$_2$—, —CH$_2$—O—CH$_2$—, —CH$_2$CH$_2$—O—CH$_2$—, —CH$_2$CH$_2$—O—CH$_2$CH$_2$—, —CH$_2$CH$_2$—O—CH$_2$CH$_2$—O—CH$_2$CH$_2$—, —CH$_2$—O—C$_6$H$_4$—, etc.

In the general formula [2] and [2a], as the halogen atoms shown by $R^4$, $R^5$, $R^6$ and $R^8$, fluorine, chlorine, bromine, iodine and the like can be referred to. The lower alkyl group shown by $R^4$, $R^5$ and $R^6$ may be straight chain, branched chain or cyclic lower alkyl groups, of which examples are lower alkyl groups having 1 to 6 carbon atoms. Specific examples of the lower alkyl group are groups such as methyl, ethyl, n-propyl, isopropyl, n-butyl, isobutyl, tert-butyl, sec-butyl, n-pentyl, isopentyl, neopentyl, tert-pentyl, 3,3-dimethylbutyl, 1,1-dimethylbutyl, 1-methylpentyl, n-hexyl, isohexyl, cyclopropyl, cyclopentyl, cyclohexyl, etc. The alkyloxycarbonyl group shown by $R^5$, $R^6$ and $R^8$ may be straight chain or branched chain alkyloxycarbonyl groups, and may have a double bond. For example, alkyloxycarbonyl groups having 2 to 19 carbon atoms can be referred to. Specific examples of the alkyloxycarbonyl group are groups such as methyloxycarbonyl, ethyloxycarbonyl, propyloxycarbonyl, butyloxycarbonyl, pentyloxycarbonyl, hexyloxycarbonyl, heptyloxycarbonyl, octyloxycarbonyl, dodecyloxycarbonyl, octadecyloxycarbonyl, ethenyloxycarbonyl, propenyloxycarbonyl, butenyloxycarbonyl, tert-butyloxycarbonyl, 2-ethylhexyloxycarbonyl, etc. The alkyl group shown by $R^8$ may be straight chain, branched chain or cyclic alkyl groups. For example, alkyl groups having 1 to 20 carbon atoms can be referred to. Specific examples of the alkyl group are groups such as methyl, ethyl, n-propyl, isopropyl, n-butyl, isobutyl, tert-butyl, sec-butyl, n-pentyl, isopentyl, neopentyl, tert-pentyl, 3,3-dimethylbutyl, 1,1-dimethylbutyl, 1-methylpentyl, n-hexyl, isohexyl, heptyl, octyl, nonyl, decyl, undecyl, dodecyl, hexadecyl, octadecyl, cyclopropyl, cyclopentyl, cyclohexyl, etc. As the haloalkyl group, there can be exemplified by haloalkyl groups of 1 to 20 carbon atoms formed by halogenation (e.g. fluorination, chlorination, bromination or iodination) of the above-mentioned alkyl groups. Specific examples of the haloalkyl group are groups such as chloromethyl, bromomethyl, trifluoromethyl, 2-chloroethyl, 3-chloropropyl, 3-bromopropyl, 3,3,3-trifluoropropyl, 2-perfluorooctylethyl, perfluorooctyl, 1-chlorodecyl, 1-chlorooctadecyl, etc. As the aryl group of an aryl group which may have substituent(s), there can be exemplified by aryl groups which may have substituent(s) of 6 to 20 carbon atoms and specific examples of the aryl group are groups such as phenyl, tolyl, xylyl, naphthyl, anthryl, 4-ethylphenyl, etc. The said substituent includes alkoxy groups of 1 to 6 carbon atoms such as methoxy, ethoxy, propoxy, butoxy, pentyloxy, hexyloxy, etc.; halogen atoms such as fluorine, chlorine, bromine, iodine, etc. and the like. Specific examples of the aryl groups which have substituent(s) are groups such as 4-methoxyphenyl, 4-chlorophenyl, etc. As the aralkyloxycarbonyl group, there can be exemplified by aralkyloxycarbonyl groups of 8 to 20 carbon atoms. Specific examples of the aralkyloxycarbonyl group are groups such as benzyloxycarbonyl, phenethyloxycarbonyl, etc. As the acyloxy group, acyloxy groups having 2 to 18 carbon atoms derived from carboxylic acids can be referred to. Specific examples of the acyloxy group are groups such as acetyloxy, propionyloxy, butylyloxy, pentanoyloxy, hexanoyloxy, heptanoyloxy, octanoyloxy, lauroyloxy, stearoyloxy, benzoyloxy, etc. As the hydroxyalkyloxycarbonyl group, there can be exemplified by hydroxyalkyloxycarbonyl groups of 2 to 19 carbon atoms formed by substituting the hydrogen atom of the above-mentioned alkyloxycarbonyl groups with a hydroxyl group. Specific examples of the hydroxyalkyloxycarbonyl group are groups such as hydroxymethyloxycarbonyl, hydroxyethyloxycarbonyl, hydroxypropyloxycarbonyl, hydroxybutyloxycarbonyl, hydroxypentyloxycarbonyl, hydroxyhexyloxycarbonyl, hydroxyheptyloxycarbonyl, hydroxyoctyloxycarbonyl, hydroxydodecyloxycarbonyl, hydroxyoctadecyloxycarbonyl, etc. As the aryloxycarbonyl group, there can be exemplified by aryloxycarbonyl groups of 7 to 20 carbon atoms. Specific examples of the aryloxycarbonyl group are groups such as phenyloxycarbonyl, naphthyloxycarbonyl, etc. The alkylene group shown by $R^7$, which may have a double bond, may be straight chain or branched chain alkylene groups, and examples thereof are alkylene groups having 1 to 10 carbon atoms. When said alkylene group has a double bond, examples of such alkylene group include alkylene groups having double bond(s) at arbitrary position of the chain in a number of one or more, preferably 1 to 5, more preferably 1 to 3. Specific examples of the alkylene group are groups such as methylene, ethylene, propylene, butylene, 2-methylpropylene, pentylene, 2,2-dimethylpropylene, 2-ethylpropylene, hexylene, heptylene, octylene, 2-ethylhexylene, nonylene, decylene, ethenylene, propenylene, butenylene, pentenylene, hexenylene, butadienylene, etc.

In the present invention, the nonionic monomer shown by the above general formula [2] which is copolymerized with the silicone-containing macro-azo-initiator is exemplified by α-ethylenically aromatic hydrocarbons having 8 to 20 carbon atoms such as styrene, 4-methylstyrene, 4-ethylstyrene, 4-methoxystyrene, etc.; vinyl esters having 3 to 20 carbon atoms such as vinyl formate, vinyl acetate, vinyl propionate, isopropenyl acetate, etc.; halogen-containing vinyl compounds having 2 to 20 carbon atoms such as vinyl chloride, vinylidene chloride, vinylidene fluoride, tetrafluoroethylene, tetrachloroethylene, 4-chlorostyrene, etc.; ethylenic carboxylic acid esters having 4 to 20 carbon atoms such as methyl methacrylate, ethyl methacrylate, propyl methacrylate, butyl methacrylate, 2-ethylhexyl methacrylate, lauryl methacrylate, stearyl methacrylate, phenyl methacrylate, benzyl methacrylate, methyl acrylate, ethyl acrylate, butyl acrylate, 2-ethylhexyl acrylate, lauryl acrylate, stearyl acrylate, dimethyl itaconate, diethyl itaconate, dimethyl maleate, diethyl maleate, dimethyl fumarate, diethyl fumarate, methyl crotonate, ethyl crotonate, dimethyl citraconate, diethyl citraconate, dimethyl mesaconate, diethyl mesaconate, methyl 3-butenoate, 2-hydroxyethyl methacrylate, 3-hydroxypropyl methacrylate, 2-hydroxypropyl methacrylate, 2-hydroxyethyl acrylate, 3-hydroxypropyl acrylate, 2-hydroxypropyl acrylate, etc.; cyano-containing vinyl compounds having 3 to 20 carbon atoms such as acrylonitrile, methacrylonitrile, allyl cyanide, etc.; ethylenic aldehydes having 3 to 20 carbon atoms such as acrolein, crotonaldehyde, etc.; ethylenic alcohols having 3 to 20 carbon atoms such as allyl alcohol, crotyl alcohol, etc.; and diene type compounds having 4 to 20 carbon atoms such as butadiene, isoprene, etc.; and the like. These monomers may be used either singly or in proper combination thereof.

The molecular weight of the silicone-containing block copolymer used in the present invention is not specifically limited, but when it is too small, the coating surface becomes sticky and strength of the coating surface is reduced, and thus it is generally 5,000 or more, preferably 10,000 to 1,000,000, more preferably 30,000 to 500,000, as a number-average molecular weight The macro-azo-initiator used for producing the silicone-containing block copolymer used in the present invention includes one shown by the above general formula [1]. When the molecular weight of the macro-azo-initiator is too small, there contains necessarily those having small number of azo groups and thus activity of the initiator becomes lower to cause reduction of the yield of the block copolymer produced, and when it is too large, it takes longer time to synthesize the initiator and the resulting initiator shows lower solubility in solvents and therefore viscosity of the reaction solution becomes higher, which makes it necessary to conduct the copolymerization reaction at low concentration of the agents, and in such reaction manner, the rate of the copolymerization with the nonionic monomer is reduced. For this reason, the molecular weight is selected from a range of generally 1,500 to 200,000, preferably 3,000 to 150,000 as a number-average molecular weight.

In the silicone-containing block copolymer used in the present invention, the constituting ratio of the siloxane segments derived from the silicone-containing macro-azo-initiator is not particularly limited, though it is properly chosen in the range of usually 1 to 90% by weight, preferably 2 to 70% by weight, more preferably 2 to 50% by weight.

Although the constituting ratio of the nonionic monomer units is not particularly limited, it is properly chosen in the range of usually 99 to 10% by weight, preferably 98 to 30% by weight, more preferably 98 to 50% by weight. When the amount is too small, the amount of silicone becomes relatively high which causes reduction of adhesive force and loss from economical aspect, and when the amount is too high, the amount of silicone becomes relatively low which causes reduction of water-repellent ability.

The silicone-containing macro-azo-initiator shown by the general formula [1] used in the present invention can easily be produced by, for example, the process described in JP-A 4-372675, etc.

Namely, said compound can be obtained, for example, by reacting a diamine or diol compound containing a polysiloxane segment shown by the general formula [3].

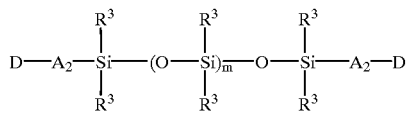

[3]

(wherein D is $NH_2$ or OH; and $R^3$, $A_2$ and m are as defined above) with an azo group-containing dibasic acid dihalide shown by the general formula [4]

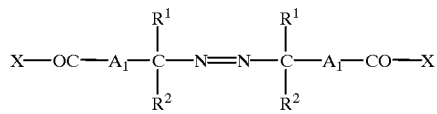

[4]

(wherein X is a halogen atom; and $R^1$, $R^2$ and $A_1$ are as defined above) in a suitable solvent, if necessary in the presence of a basic catalyst.

As the silicone-containing macro-azo-initiator shown by the general formula [1] used in the present invention, there may be used that produced by, for example, the process disclosed in JP-A 6-93100, JP-A 6-322089,or the like.

Namely, said compound can be obtained also by reacting a diamine or diol compound containing a polysiloxane segment shown by the general formula [3] with an azo group-containing dibasic acid shown by the general formula [5]

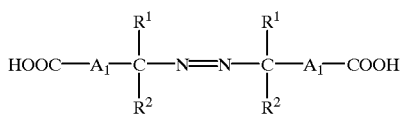

[5]

(wherein $R^1$, $R^2$ and $A_1$ are as defined above) by use of a dehydrating agent in a suitable solvent, if necessary in the presence of a basic catalyst.

As the halogen atom shown by X in the general formula [4], fluorine, chlorine, bromine, iodine and the like can be referred to.

Both of the above-mentioned production processes are preferably conducted in the presence of a basic catalyst. Specific examples of the basic catalyst includes organic amines such as triethylamine, diisopropylethylamine, N,N-dimethylaniline, piperidine, pyridine, 4-dimethylaminopyridine, 1,5-diazabicyclo[4.3.0]non-5-ene, 1,8-diazabicyclo[5.4.0]undec-7-ene, tri-n-butylamine, N-methylmorpholine, etc.; metal hydrides such as sodium hydride etc.; and basic alkali metal compounds such as n-butyllithium, tert-butyllithium, etc.; and the like.

Although an amount of the basic catalyst used is not particularly limited, it is properly chosen in the range of usually 0.5 to 5 moles, preferably 0.5 to 1.5 moles per mole of the starting compound shown by the general formula [4] or [5] or the dehydrating agent.

The dehydrating agent used in the latter process is not particularly limited so long as it can be used as a dehydrating-condensation agent. Specific examples of the dehydrating agent includes inorganic dehydrating agents such as concentrated sulfuric acid, diphosphorus pentoxide, anhydrous zinc chloride, etc.; carbodiimides such as dicyclohexylcarbodiimide, diisopropylcarbodiimide and 1-ethyl-3-(3-dimethylaminopropylcarbodiimide) hydrochloride, etc.; polyphosphoric acid, acetic anhydride, carbonyldiimidazole, p-toluenesulfonyl chloride and the like.

Although an amount of the dehydrating agent used is not particularly limited, it is properly chosen in the range of usually 1 to 5 moles, preferably 2 to 3 moles, per mole of the corresponding diamine or diol compound. When the amount is too small, the reaction rate is slow and only a low molecular weight can be attained. When the amount is too large, a high molecular weight can be attained in a short time, but control of the molecular weight is difficult and the large amount is not economical.

The reaction solvent to be used in both processes includes, for example, ethers such as diethyl ether, diisopropyl ether, tetrahydrofuran, dioxane, dimethoxyethane, etc.; halogenated hydrocarbons such as carbon tetrachloride, chloroform, methylene chloride, dichloroethane, trichloroethylene, etc.; hydrocarbons such as n-hexane, benzene, toluene, xylene, etc.; esters such as ethyl acetate, butyl acetate, methyl propionate, etc.; acetonitrile, N,N-dimethylformamide, N,N-dimethylacetamide and the like. These solvents may be used singly or as a mixture thereof.

The proportions of the diamine or diol compound shown by the general formula [3] and the azo group-containing dibasic acid dihalide shown by the general formula [4] or the azo group-containing dibasic acid shown by the general formula [5] are not particularly limited and are properly determined. For obtaining an azo group-containing polysiloxane having a high molecular weight, it is preferable to use the diamine or diol compound and the dihalide or the dibasic acid in substantially equimolar amounts.

The reaction temperature is not particularly limited, and when it is too high, the azo groups are decomposed, and when it is too low, the reaction speed is decreased and a silicone-containing macro-azo-initiator having high molecular weight is difficult to produce, and thus it is selected from a range generally of −10 to 60° C. The reaction temperature may be raised stepwise from a low temperature.

The reaction time depends upon the reaction method and is generally selected from a range of 1 to 60 hours.

Isolation of the object product can be suitably conducted in accordance with the kinds and amounts of the starting material, the basic catalyst, the dehydrating agent, the solvent, etc., and the condition of a reaction solution. When the resultant solution is viscous, for instance, the solution is diluted with a suitable solvent, impurities such as quaternary ammonium salt by-products are removed by filtration or washing with water and then the solvent is removed, whereby the object silicone-containing macro-azo-initiator can be obtained. The thus produced macro-azo-initiator can directly, without purification and/or isolation, be subjected to the polymerization.

As the diamine or diol compound containing a polysiloxane segment shown by the general formula [3], the azo group-containing dibasic acid dihalide shown by the general formula [4] and the azo group-containing dibasic acid shown by the general formula [5] used as starting materials, any of commercially products and home-made products appropriately prepared by conventional methods may be used.

The silicone-containing block copolymer used in the present invention can be produced, for example, in the following manner.

Namely, the silicone-containing macro-azo-initiator obtained in the above-mentioned manner and the above-mentioned nonionic monomer are subjected to a conventional polymerization in a suitable solvent or in an absence of solvent, and if desired under inert gas atmosphere.

After the reaction, a post-treatment and the like may be carried out according to the conventional procedure in this technical field of the art. The thus produced silicone-containing block copolymer of the present invention, which contains also non-reacted nonionic monomer and others, is once generally purified and/or isolated by extraction, recrystallization or other means and then subjected to the next stage of reaction. As the case may be, however, the crude block copolymer may directly be subjected to the next stage of reaction without purification and/or isolation.

In carrying out polymerization, the molecular weight may be controlled by adding a chain transfer agent such as lauryl mercaptan, octyl mercaptan, butyl mercaptan, 2-mercaptoethanol, butyl thioglycolate, etc., if necessary.

As the method of the above-mentioned polymerization, a suspension polymerization, a solution polymerization, a bulk polymerization, an emulsion polymerization and the like can be exemplified. In these polymerization methods, the silicone-containing macro-azo-initiator may be used in combination with a conventional radical polymerization initiator such as azobisisobutylonitrile, dimethyl 2,2'-azobisisobutyrate, etc.

The concentration of the silicone-containing macro-azo-initiator and the nonionic polymerizable monomer in the polymerization reaction is selected in such a way that the total of the both components becomes generally 5 to 100% by weight, preferably 5 to 80% by weight, more preferably 10 to 70% by weight, further preferably 20 to 50% by weight.

The polymerization is preferably carried out in the presence of an organic solvent. The organic solvent includes, for example, hydrocarbons such as toluene, xylene, benzene, cyclohexane, n-hexane, n-octane, etc.; halogenated hydrocarbons such as methylene chloride, chloroform, carbon tetrachloride, dichloroethane, trichloroethylene, etc.; esters such as methyl acetate, ethyl acetate, n-butyl acetate, methyl propionate, etc.; ketones such as acetone, methyl ethyl ketone, methyl isobutyl ketone, cyclohexanone, etc.; cyclic ethers such as tetrahydrofuran, dioxane, etc.; alcohols such as methanol, ethanol, n-propanol, isopropanol, n-butanol, isobutanol, tert-butanol, etc.; N-methylpyrrolidone, N,N-dimethylformamide, N,N-dimethylacetamide, dimethylsulfoxide and the like. These solvents may be used singly or as a mixture thereof.

The polymerization is preferably carried out under inert gas atmosphere. As the inert gas, nitrogen gas, argon gas and the like can be referred to.

Although the polymerization temperature is not specifically limited, when it is too low, the degree of decomposition of azo groups is low and thus the polymerization rate is decreased and when it is too high, too many azo groups are decomposed to make it difficult to control the polymerization, and thus it is selected from a range generally of 20 to 150° C., preferably 40 to 120° C.

Although the polymerization time is different according to the reaction temperature, the kinds of the silicone-containing macro-azo-initiator and the nonionic monomer used and concentrations of the components, other conditions, it is generally selected from 2 to 24 hours.

By this polymerization, the azo groups are decomposed to generate radicals by which the nonionic monomer is copolymerized, whereby the block copolymer is obtained. The thus obtained copolymer comprises a repeating unit shown by the following general formula [1a]

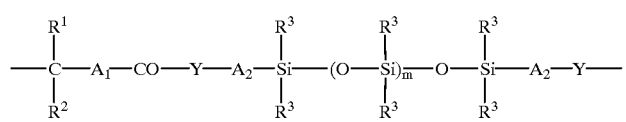

[wherein U is the siloxane segment; V and V' independently are the nonionic monomer unit; "a" and c independently are a natural number; and b is 0 or a natural number, and { } means a random structure including various structures such as graft type, block type, etc. and other copolymer structures].

Thus obtained silicone-containing macro-azo-initiator and silicone-containing block copolymer show excellent effects in water-repellent, oil-repellent, heat resistance, weathering resistance, chemical resistance, anti-staining and adhesive force, etc. because of the siloxane segment contained in the molecules, and thus the cured materials of unsaturated polyester resin having the above mentioned properties can be produced by adding those compounds during the curing reaction of unsaturated polyester resin.

The cured materials of unsaturated polyester resin of the present invention are prepared as follows.

The above obtained block copolymer and/or the silicone-containing macro-azo-initiator of the general formula [1] is mixed with an unsaturated polyester resin composition, followed by curing reaction after a conventional manner, or upon curing an unsaturated polyester resin composition after a conventional manner, the above obtained macro-azo-initiator and/or the block copolymer is, after being dissolved in a solvent if necessary, allowed to contact with the surface of the unsaturated polyester resin composition before completion of the curing reaction by coating, applying, spreading, spraying, etc., so that the curing reaction continues to completion. In this way, cured materials of unsaturated polyester resin containing a siloxane part on its surface layer are obtained.

After the reaction, a post-treatment and the like may be carried out according to the conventional procedure in this (wherein $R^1$, $R^2$, $R^3$, $A_1$, $A_2$ Y and m are as defined above) as the siloxane segment and a repeating unit shown by the general formula [2a]

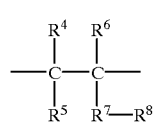

(wherein $R^4$ through $R^8$ as defined above) as the nonionic monomer unit.

Polymer compounds have generally complicated structures and it is hardly possible to illustrate the structures clearly, and the silicone-containing block copolymer used in the present invention thus obtained above may be shown, for instance, as any one of or any two or three combinations of the structures shown by the following general formulas [6] to [8] but not limited thereto by any means.

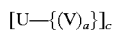 [6]

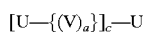 [7]

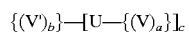 [8]

technical field of the art, whereby desired cured materials of unsaturated polyester resin can be obtained.

An amount of the macro-azo-initiator or silicone-containing block copolymer to be used is selected from such a range that the object properties can satisfactorily obtained and the curing reaction is not seriously prohibited.

Namely, an amount of the block copolymer to be mixed with the unsaturated polyester resin composition is 0.1 to 90% by weight, preferably 0.1 to 60% by weight, more preferably 0.5 to 30% by weight, and an amount of the silicone-containing macro-azo-initiator to be mixed with the unsaturated polyester resin composition is 0.1 to 50% by weight, preferably 0.1 to 40% by weight, more preferably 0.5 to 30% by weight.

When both the block copolymer and the macro-azo-initiator are mixed with the unsaturated polyester resin composition, an amount of the former is 0.1 to 50% by weight, preferably 0.5 to 30% by weight, and that of the latter is 1 to 30% by weight, preferably 1 to 20% by weight.

The unsaturated polyester resin composition of the present invention includes one comprising an unsaturated polyester component and a polymerizable vinyl monomer component as the essential ingredients.

The unsaturated polyester used in the present invention includes those obtained by subjecting a polybasic acid and a polyhydric alcohol to a polycondensation reaction.

The polybasic acids include unsaturated acids such as maleic anhydride, maleic acid, fumaric acid, itaconic acid, citraconic acid, methaconic acid, etc.; saturated acids such as adipic acid, phthalic anhydride, isophthalic acid, tetrachlorophthalic anhydride, 3,6-endodichloromethylene tetrachlorophthalic acid, 3,6-endomethylene tetrahydrophthalic anhydride, etc. and the like may be co-used.

The polyhydric alcohols include ethylene glycol, propylene glycol, 1,3-butane diol, 1,4-butanediol, diethylene glycol, dipropylene glycol, neopentyl glycol, 1,6-hexanediol, 2,2,4-trimethyl-1,6-hexanediol, triethylene glycol, bisphenol-A propylene oxide adduct, glycerin, trimethylolpropane and the like.

The polymerizable vinyl monomers are not specifically limited so far it can be used as a vinyl monomer for cross-linking and is exemplified by styrene, vinyltoluene, divinylbenzene, o-chlorostyrene, dichlorostyrene, vinyl acetate, diallyl phthalate, diallyl isophthalate, diallyl terephthalate, triallyl isocyanurate, triallyl trimeritate, methyl methacrylate, diallylbenzene phosphonate and the like.

The solvent to be used for dissolving the macro-azo-initiator and/or the silicone-containing block copolymer is not specifically limited and includes aromatic hydrocarbons such as benzene, toluene, xylene, styrene, etc.; ketones such as acetone, methyl ethyl ketone, etc.; ethers such as diethyl ether, diisopropyl ether, tetrahydrofuran, dioxane, dimethoxyethane, etc.; lower alcohols such as methanol, ethanol, propanol, isopropanol, butanol, sec-butanol, etc.; esters such as methyl acetate, ethyl acetate, butyl acetate, methyl propionate etc.; and the like. These solvents may be used singly or as a mixture thereof.

The unsaturated polyester resin composition may be incorporated with a curing catalyst, a curing accelerator, and other components upon necessity so far as they do not degrade the properties of the composition. Those other components usable are exemplified by thickeners such as alkaline earth metal oxides (e.g. magnesium oxide), alkaline earth metal hydroxides (e.g. calcium hydroxide), alkaline earth metal carbonates (e.g. calcium carbonate), etc., mold-release agents such as stearic acid, etc., pigments such as titanium dioxide, phthalocyanine type pigment etc., fillers such as glass fiber, carbon fiber, etc., ultraviolet absorbers such as 2,2'-dihydroxy-4,4'-dimethoxybenzophenone, etc., antibacterial agents and anti-mold agents such as 2-(4thiazolyl)benzimidazole, etc., aggregates such as liquid paraffin, etc., coloring matters, dyes, antioxidants, light stabilizers and the like.

As the curing catalyst used in the present invention, any one can be used without any limitation so far as it can be used as a polymerization initiator in a polymerization reaction, and there are exemplified by peroxides such as methyl ethyl ketone peroxide, benzoyl peroxide, cyclohexanone peroxide, di-tert-butyl peroxide, tert-butyl peroxy-2-ethylhexanoate, tert-butyl perbenzoate, cumene hydroperoxide, dicumyl peroxide, lauroyl peroxide, etc.; azo compounds such as azobisisobutyronitrile, 2,2'-azobis(2-amidinopropane) dihydrochloride, 2,2'-azobis (4methoxy-2, 4dimethylvaleronitrile), 2,2'-azobis(2, 4dimethylvaleronitrile), 1,1'-azobis(cyclohexane-1-carbonitrile), 4,4'-azobis(4-cyanopentanoic acid), 2,2'-azobis[2-(2-imidazolin-2-yl)propane] dihydrochloride, 2,2'-azobis[2-methyl-N-(2-hydroxyethyl)propionamide], etc.; persulfate acid compounds such as potassium persulfate, ammonium persulfate, etc.; and the like.

Although an amount of the curing catalyst to be used is not specifically limited, it is generally selected from a range of generally 0.01 to 5% by weight, preferably 0.1 to 3% by weight relative to the unsaturated polyester.

The curing accelerator includes organic metal compounds such as cobalt naphthenate, dibutyltin dilaurate, dibutyltin diacetate, dibutyltin bis(2-ethylhexanoate), diethylzinc, tetra (n-butoxy)titanium, etc.; organic amines such as triethylamine, N,N-dimethylaniline, piperidine, pyridine, 4-dimethylaminopyridine, tri-n-butylamine, 4-pyrrolidinopyridine, etc.; inorganic accelerators such as zinc chloride, sodium hydroxide, potassium hydroxide, sulfuric acid, etc.; and the like.

Although an amount of the curing accelerator to be used is not specifically limited, it is selected from a range generally of 0.01 to 5% by weight, preferably 0.1 to 3% by weight relative to the unsaturated polyester.

Although the curing temperature is different according to the kinds of the unsaturated polyester, the curing agent and the curing accelerator and concentrations thereof, it is selected from a range generally of 10 to 60° C., preferably 20 to 50° C. upon curing at normal temperature, selected from a range generally of 50 to 90° C., preferably 60 to 80° C. upon curing at mediate temperature and selected from a range generally of 80° C. or higher, preferably 90 to 130° C. upon curing at high temperature.

An amount of silicone in the silicone-containing macro-azo-initiator and/or silicone-containing block copolymer upon the above mentioned treatment of unsaturated polyester resin by curing reaction depends upon an amount to be applied to the unsaturated polyester resin composition, and when it is too small, formation of silicone layer on the surface of the substrate becomes difficult so that a pin hole having no silicone is formed, and when it is too large, the adhesive force becomes lower, and thus it is selected from a range of generally 0.1 to 90% by weight, preferably 0.5 to 50% by weight, more preferably 1 to 20% by weight, relative to the amount of the unsaturated polyester resin composition.

Thus obtained cured materials of unsaturated polyester resin of the present invention contains siloxane part on their surface layer, which is derived from the silicone-containing macro-azo-initiator and/or silicone-containing block copolymer, and thus they are excellent in water-repellent, any weathering resistance, solvent resistance, and so on, and therefore they can widely be used in artificial marble, buttons, resin concrete, building materials such as corrugated plates and pipes, housing materials such as bath tubs and cleaning tanks, transportation materials such as parts of ships, automobiles and air planes, other housing goods, leisure goods and so on.

In the following, the present invention is further explained in details referring to Reference Examples, Synthesis Examples, Examples and Comparative Examples, but the present invention is not limited thereto by any means.

Reference Example 1

Synthesis of a Silicone-containing Macro-azo-initiator (Hereinafter Abbreviated as MAI)

In 160 ml of methylene chloride were dissolved 3.5 g of 4-dimethylaminopyridine (hereinafter abbreviated as DMAP) and 8.0 g of 4,4'-azobis(4-cyanopentanoic acid) (V-501, a trade name, manufactured by Wako Pure Chemical Industries, Ltd., hereinafter referred to as "V-501"), followed by adding thereto 125 g of an amino-modified silicone KF-8012 {a compound of the above general formula [3] wherein $R^3$ is a methyl group, D is an amino group, $A_2$ is $(CH_2)_3$, and m is about 56 on the average; a trade name; mfd. Shin-Etsu Silicone Co., Ltd.} and then were added 13.0 g of dicyclohexylcarbodiimide (hereinafter abbreviated as DCC), and the reaction was carried out with stirring at 20 to 30° C. for 4 hours. Subsequently, the reaction mixture was diluted with 160 ml of methylene chloride and the reaction was terminated by adding water and methanol. The crystals precipitated were removed by filtration and the filtrate was poured into a large amount of methanol to precipitate the objective product. The supernatant was removed and the residue was dried under reduced pressure at room temperature to give 103 g of the objective product. The product was confirmed to be an azo group-containing polysiloxane amide having polysiloxane segments, from $^1$H-NMR spectrum and infrared spectrum. The azo group-containing polysiloxane amide had a number-average molecular weight of 20,000 as measured by GPC analysis, and an average number of azo groups bonded of 4.3. Hereinafter, this product is referred to as MAI-1.

Reference Example 2
Synthesis of MAI

In 2,500 ml of methylene chloride were dissolved 33.7 g of DMAP and 77.3 g of V-501, followed by adding thereto 1,214 g of an amino-modified silicone KF-8012 and then were added 125 g of DCC, and the reaction was carried out with stirring at 20 to 30° C. for 7 hours. Subsequently, the reaction was terminated by adding water and methanol. The crystals precipitated were removed by filtration and the filtrate was poured into a large amount of methanol to precipitate the objective product. The supernatant was removed and the residue was dried under reduced pressure at room temperature to give 1,070 g of the objective product. The product was confirmed to be an azo group-containing polysiloxane amide having polysiloxane segments, from $^1$H-NMR spectrum and infrared spectrum. The azo group-containing polysiloxane amide had a number-average molecular weight of 30,000 as measured by GPC analysis, and an average number of azo groups bonded of 6.5. Hereinafter, this product is referred to as MAI-2.

Reference Example 3
Synthesis of MAI

In 160 ml of methylene chloride were dissolved 3.5 g of DMAP and 8.0 g of V-501, followed by adding thereto 125 g of an amino-modified silicone KF-8012 and then were added 13.0 g of DCC, and the reaction was carried out with stirring at 20 to 30° C. for 8 hours. After standing overnight, the reaction mixture was diluted with 160 ml of methylene chloride and the reaction was terminated by adding water and methanol. The crystals precipitated were removed by filtration and the filtrate was poured into a large amount of methanol to precipitate the objective product. The supernatant was removed and the residue was dried under reduced pressure at room temperature to give 114 g of the objective product. The product was confirmed to be an azo group-containing polysiloxane amide having polysiloxane segments, from $^1$H-NMR spectrum and infrared spectrum. The azo group-containing polysiloxane amide had a number-average molecular weight of 45,000 as measured by GPC analysis, and an average number of azo groups bonded of 9.7. Hereinafter, this product is referred to as MAI-3.

Reference Example 4
Synthesis of MAI

In 160 ml of methylene chloride were dissolved 3.5 g of DMAP and 8.0 g of V-501, followed by adding thereto 325 g of an amino-modified silicone KF-8008 {a compound of the above general formula [3] wherein $R^3$ is a methyl group, D is an amino group, $A_2$ is $(CH_2)_3$, and m is about 150 on the average; a trade name; manufactured by Shin-Etsu Silicone Co., Ltd.} and then were added 13.0 g of DCC, and the reaction was carried out with stirring at 20 to 30° C. for 5 hours. Subsequently, the reaction mixture was diluted with 160 ml of methylene chloride and the reaction was terminated by adding water and methanol. The crystals precipitated were removed by filtration and the filtrate was poured into a large amount of methanol to precipitate the objective product. The supernatant was removed and the residue was dried under reduced pressure at room temperature to give 275 g of the objective product. The product was confirmed to be an azo group-containing polysiloxane amide having polysiloxane segments, from $^1$H-NMR spectrum and infrared spectrum. The azo group-containing polysiloxane amide had a number-average molecular weight of 47,000 as measured by GPC analysis, and an average number of azo groups bonded of 4.0. Hereinafter, this product is referred to as MAI-4.

Reference Example 5
Synthesis of MAI

In 540 ml of methylene chloride were dissolved 13.2 g of DMAP and 30.3 g of V-501, followed by adding thereto 1230 g of an amino-modified silicone KF-8008 and then were added 49.8 g of DCC, and the reaction was carried out with stirring at 20 to 30° C. for 8 hours. After standing overnight, the reaction mixture was diluted with 2,400 ml of methylene chloride and the reaction was terminated by adding water and methanol. The crystals precipitated were removed by filtration and the filtrate was poured into a large amount of methanol to precipitate the objective product. The supernatant was removed and the residue was dried under reduced pressure at room temperature to give 1,050 g of the objective product. The product was confirmed to be an azo group-containing polysiloxane amide having polysiloxane segments, from $^1$H-NMR spectrum and infrared spectrum. The azo group-containing polysiloxane amide had a number-average molecular weight of 86,000 as measured by GPC analysis, and an average number of azo groups bonded of 7.4. Hereinafter, this product is referred to as MM-5.

Reference Example 6
Synthesis of MAI

In 160 ml of methylene chloride were dissolved 3.5 g of DMAP and 8.0 g of V-501, followed by adding thereto 325 g of an amino-modified silicone KF-8008 and then were added 13.0 g of DCC, and the reaction was carried out with stirring at 20 to 30° C. for 12 hours. Subsequently, the reaction mixture was diluted with 160 ml of methylene chloride and the reaction was terminated by adding water and methanol. The crystals precipitated were removed by filtration and the filtrate was poured into a large amount of methanol to precipitate the objective product. The supernatant was removed and the residue was dried under reduced pressure at room temperature to give 275 g of the objective product. The product was confirmed to be an azo group-containing polysiloxane amide having polysiloxane segments, from $^1$H-NMR spectrum and infrared spectrum. The azo group-containing polysiloxane amide had a number-average molecular weight of 125,000 as measured by GPC analysis, and an average number of azo groups bonded of 10.7. Hereinafter, this product is referred to as MAI-6.

Reference Example 7
Synthesis of MAI

In 200 ml of methylene chloride were dissolved 4.4 g of DMAP and 10.0 g of V-501, followed by adding thereto 222 g of an alcohol-modified silicone BX16-004 (a compound of the above general formula [3] wherein $R^3$ is a methyl group, D is a hydroxyl group, and m is about 90 on the average; a trade name; manufactured by Toray Dow Corning Co., Ltd.) and then were added 16.0 g of DCC, and the reaction was carried out with stirring at 20 to 30° C. for 8 hours. Subsequently, the reaction mixture was diluted with 200 ml of methylene chloride and the reaction was terminated by adding water and methanol. The crystals precipitated were removed by filtration and the filtrate was poured into a large amount of methanol to precipitate the objective product. The supernatant was removed and the residue was dried under reduced pressure at room temperature to give 185 g of the objective product. The product was confirmed to be an azo group-containing polysiloxane ester having polysiloxane segments, from $^1$H-NMR spectrum and infrared spectrum. The azo group-containing polysiloxane amide had a number-average molecular weight of 20,000 as measured by GPC analysis, and an average number of azo groups bonded of 2.7. Hereinafter, this product is referred to as MAI-7.

Reference Example 8

Synthesis of MAI

In 1,500 ml of methylene chloride were dissolved 65.4 g of DMAP and 150.0 g of V-501, followed by adding thereto 437 g of an amino-modified silicone X-22-161AS {a compound of the above general formula [3] wherein $R^3$ is a methyl group, D is an amino group, $A_2$ is $(CH_2)_3$, and m is about 9 on the average; a trade name; manufactured by Shin-Etsu Silicone Co., Ltd.} and then were added 244 g of DCC, and the reaction was carried out with stirring at 20 to 30° C. for 8 hours. Subsequently, the reaction mixture was diluted with 750 ml of methylene chloride and the reaction was terminated by adding water and methanol. The crystals precipitated were removed by filtration and the filtrate was poured into a large amount of methanol to precipitate the objective product. The supernatant was removed and the residue was dried under reduced pressure at room temperature to give 475 g of the objective product. The product was confirmed to be an azo group-containing polysiloxane amide having polysiloxane segments, from $^1$H-NMR spectrum and infrared spectrum. The azo group-containing polysiloxane amide had a number-average molecular weight of 12,000 as measured by GPC analysis, and an average number of azo groups bonded of 10.4. Hereinafter, this product is referred to as MAI-8.

Reference Example 9

Synthesis of MAI

In 160 ml of methylene chloride were dissolved 3.5 g of DMAP and 8.0 g of V-501, followed by adding thereto 125 g of an amino-modified silicone KF-8012 and then were added 13.0 g of DCC, and the reaction was carried out with stirring at 20 to 30° C. for 7.5 hours. Subsequently, the reaction was terminated by adding water and methanol. The crystals precipitated were removed by filtration and the filtrate was poured into a large amount of methanol to precipitate the objective product. The supernatant was removed and the residue was dried under reduced pressure at room temperature to give 110 g of the objective product. The product was confirmed to be an azo group-containing polysiloxane amide having polysiloxane segments, from $^1$H-NMR spectrum and infrared spectrum. The azo group-containing polysiloxane amide had a number-average molecular weight of 37,200 as measured by GPC analysis, and an average number of azo groups bonded of 9.5. Hereinafter, this product is referred to as MAI-9.

Reference Example 10

Synthesis of MAI

In 160 ml of methylene chloride were dissolved 3.5 g of DMAP and 8.0 g of V-501, followed by adding thereto 325 g of an amino-modified silicone KF-8008 and then were added 13.0 g of DCC, and the reaction was carried out with stirring at 20 to 30° C. for 5 hours. Subsequently, the reaction mixture was diluted with 160 ml of methylene chloride and the reaction was terminated by adding water and methanol. The crystals precipitated were removed by filtration and the filtrate was poured into a large amount of methanol to precipitate the objective product. The supernatant was removed and the residue was dried under reduced pressure at room temperature to give 275 g of the objective product. The product was confirmed to be an azo group-containing polysiloxane amide having polysiloxane segments, from $^1$H-NMR spectrum and infrared spectrum. The azo group-containing polysiloxane amide had a number-average molecular weight of 127,000 as measured by GPC analysis, and an average number of azo groups bonded of 11.5. Hereinafter, this product is referred to as MAI-10.

Synthesis Example 1

Synthesis of a Silicone-containing Block Copolymer (Hereinafter Abbreviated as BP)

A mixture of 25.0 g of MAI-1 obtained in Reference Example 1, 25.0 g of methyl methacrylate (hereinafter abbreviated as MMA), 33.25 g of n-butyl methacrylate (hereinafter abbreviated as BMA) and 200 g of toluene was subjected to a polymerization reaction at 90° C. for 5 hours under a nitrogen stream. After the reaction, the reaction mixture was poured into methanol to precipitate a block copolymer. The copolymer was collected by filtration, washed, and then dried under reduced pressure at 80° C. for 6 hours to give 68 g (82% yield) of the objective block copolymer. A $^1$H-NMR analysis revealed that the copolymer composition of this product was 20.1:24.6:54.3 as expressed in terms of dimethylsiloxane segment (hereinafter abbreviated as DMS): MMA:BMA ratio by weight, and a GPC measurement revealed that this product was a vinyl-silicone block copolymer having a number-average molecular weight of 84,000 and a weight-average molecular weight of 129,900. Hereinafter this copolymer is abbreviated as BP-A.

Synthesis Example 2

Synthesis of BP

A mixture of 25.0 g of MAI-4 obtained in Reference Example 4, 100 g of MMA and 240 g of toluene was subjected to a polymerization reaction at 70° C. for 5 hours under a nitrogen stream. After the reaction, the reaction mixture was poured into methanol to precipitate a block copolymer. The copolymer was collected by filtration, washed, and then dried under reduced pressure at 80° C. for 6 hours to give 67.2 g (53.8% yield) of the objective block copolymer. A $^1$H-NMR analysis revealed that the copolymer composition of this product was 31.0:69.0 as expressed in terms of DMS:MMA ratio by weight, and a GPC measurement revealed that this product was a vinyl-silicone block copolymer having a number-average molecular weight of 80,700 and a weight-average molecular weight of 149,000. Hereinafter this copolymer is abbreviated as BP-B.

Synthesis Example 3

Synthesis of BP

A mixture of 25.0 g of MAI-7 obtained in Reference Example 7, 100 g of MMA and 260 g of toluene was subjected to a polymerization reaction at 70° C. for 5 hours under a nitrogen stream. After the reaction, the reaction mixture was poured into methanol to precipitate a block copolymer. The copolymer was collected by filtration, washed, and then dried under reduced pressure at 80° C. for 6 hours to give 92 g (74% yield) of the objective block copolymer. A $^1$H-NMR analysis revealed that the copolymer composition of this product was 23.8:76.2 as expressed in terms of DMS:MMA ratio by weight, and a GPC measurement revealed that this product was a vinyl-silicone block copolymer having a number-average molecular weight of 54,000 and a weight-average molecular weight of 90,000. Hereinafter this copolymer is abbreviated as BP-C.

Synthesis Example 4
Synthesis of BP

A mixture of 25.0 g of MAI-3 obtained in Reference Example 3, 100 g of MMA and 260 g of toluene was subjected to a polymerization reaction at 70° C. for 5 hours under a nitrogen stream. After the reaction, the reaction mixture was poured into methanol to precipitate a block copolymer. The copolymer was collected by filtration, washed, and then dried under reduced pressure at 80° C. for 6 hours to give 88 g (70% yield) of the objective block copolymer. A $^1$H-NMR analysis revealed that the copolymer composition of this product was 29.2:70.8 as expressed in terms of DMS:MMA ratio by weight, and a GPC measurement revealed that this product was a vinyl-silicone block copolymer having a number-average molecular weight of 64,100 and a weight-average molecular weight of 105,000. Hereinafter this copolymer is abbreviated as BP-D.

Synthesis Example 5
Synthesis of BP

A mixture of 25.0 g of MAI-3 obtained in Reference Example 3, 100 g of styrene (hereinafter abbreviated as St) and 260 g of toluene was subjected to a polymerization reaction at 70° C. for 5 hours under a nitrogen stream. After the reaction, the reaction mixture was poured into methanol to precipitate a block copolymer. The copolymer was collected by filtration, washed, and then dried under reduced pressure at 80° C. for 6 hours to give 49 g (39% yield) of the objective block copolymer. A $^1$H-NMR analysis revealed that the copolymer composition of this product was 44.8:55.2 as expressed in terms of DMS:St ratio by weight, and a GPC measurement revealed that this product was a vinyl-silicone block copolymer having a number-average molecular weight of 73,000 and a weight-average molecular weight of 149,000. Hereinafter this copolymer is abbreviated as BP-E.

Synthesis Example 6
Synthesis of BP

A mixture of 25.0 g of MAI-8 obtained in Reference Example 8, 100 g of MMA and 260 g of toluene was subjected to a polymerization reaction at 70° C. for 5 hours under a nitrogen stream. After the reaction, the reaction mixture was poured into methanol to precipitate a block copolymer. The copolymer was collected by filtration, washed, and then dried under reduced pressure at 80° C. for 6 hours to give 81 g (65% yield) of the objective block copolymer. A $^1$H-NMR analysis revealed that the copolymer composition of this product was 7.4:92.6 as expressed in terms of DMS:MMA ratio by weight, and a GPC measurement revealed that this product was a vinyl-silicone block copolymer having a number-average molecular weight of 36,000 and a weight-average molecular weight of 52,000. Hereinafter this copolymer is abbreviated as BP-F.

Synthesis Example 7
Synthesis of BP

A mixture of 25.0 g of MAI-3 obtained in Reference Example 3, 25 g of MMA and 260 g of toluene was subjected to a polymerization reaction at 70° C. for 5 hours under a nitrogen stream. After the reaction, the reaction mixture was poured into methanol to precipitate a block copolymer. The copolymer was collected by filtration, washed, and then dried under reduced pressure at 80° C. for 6 hours to give 34 g (68% yield) of the objective block copolymer. A $^1$H-NMR analysis revealed that the copolymer composition of this product was 74.1:25.9 as expressed in terms of DMS:MMA ratio by weight, and a GPC measurement revealed that this product was a vinyl-silicone block copolymer having a number-average molecular weight of 32,000 and a weight-average molecular weight of 54,000. Hereinafter this copolymer is abbreviated as BP-G.

Synthesis Example 8
Synthesis of BP

A mixture of 25.0 g of MAI-3 obtained in Reference Example 3, 100 g of BMA and 260 g of toluene was subjected to a polymerization reaction at 70° C. for 5 hours under a nitrogen stream. After the reaction, the reaction mixture was poured into methanol to precipitate a block copolymer. The copolymer was collected by filtration, washed, and then dried under reduced pressure at 80° C. for 6 hours to give 75 g (60% yield) of the objective block copolymer. A $^1$H-NMR analysis revealed that the copolymer composition of this product was 39.8:60.2 as expressed in terms of DMS:BMA ratio by weight, and a GPC measurement revealed that this product was a vinyl-silicone block copolymer having a number-average molecular weight of 67,000 and a weight-average molecular weight of 125,000. Hereinafter this copolymer is abbreviated as BP-H.

Synthesis Example 9
Synthesis of BP

A mixture of 25.0 g of MAI-3 obtained in the same manner as described in Reference Example 3, 50 g of MMA, 50 g of n-butyl acrylate (hereinafter abbreviated as BA) and 260 g of toluene was subjected to a polymerization reaction at 70° C. for 5 hours under a nitrogen stream. After the reaction, the reaction mixture was poured into methanol to precipitate a block copolymer. The copolymer was collected by filtration, washed, and then dried under reduced pressure at 80° C. for 6 hours to give 106 g (85% yield) of the objective block copolymer. A $^1$H-NMR analysis revealed that the copolymer composition of this product was 39.1:39.9:21.0 as expressed in terms of DMS:MMA:BA ratio by weight, and a GPC measurement revealed that this product was a vinyl-silicone block copolymer having a number-average molecular weight of 67,000 and a weight-average molecular weight of 125,000. Hereinafter this copolymer is abbreviated as BP-I.

EXAMPLE 1

In 10 g of unsaturated polyester resin Polymal6304 (a trade name, mfd. by Takeda Chemical Industries, Ltd., hereinafter is called "Polymal6304") were dissolved 0.1 g of BP-A, followed by adding thereto 0.04 g of cobalt naphthenate [concentration of cobalt: 8% by weight, mfd. by nacalai tesque Co. Ltd.] and 0.1 g of 55% by weight methyl ethyl ketone peroxide solution in dimethyl phthalate (PAMEKKU M, a trade name, manufactured by Nippon Oil and Fat Co. Ltd., hereinafter abbreviated as MEKPO) and then admixing. The resultant was poured in a silicone rubber mold and carried out curing reaction.

EXAMPLE 2

In 10 g of Polymal6304 were dissolved 0.5 g of BP-A, followed by adding thereto 0.04 g of cobalt naphthenate and 0.1 g of MEKPO and then admixing. The resultant was poured in a silicone rubber mold and a curing reaction carried out.

EXAMPLE 3

In 10 g of Polymal6304 were dissolved 0.05 g of BP-A, followed by adding thereto 0.04 g of cobalt naphthenate and 0.1 g of MEKPO and then admixing. The resultant was poured in a silicone rubber mold and a curing reaction carried out.

EXAMPLE 4

In 10 g of Polymal6304 were dissolved 0.1 g of MAI-10, followed by adding thereto 0.04 g of cobalt naphthenate and 0.1 g of MEKPO and then admixing. The resultant was poured in a silicone rubber mold and a curing reaction carried out.

EXAMPLE 5

In 10 g of Polymal6304 were dissolved 0.05 g of BP-E, followed by adding thereto 0.04 g of cobalt naphthenate and 0.1 g of MEKPO and then admixing. The resultant was poured in a silicone rubber mold and a curing reaction carried out.

EXAMPLE 6

In 10 g of Polymal6304 were dissolved 0.1 g of BP-E, followed by adding thereto 0.04 g of cobalt naphthenate and 0.1 g of MEKPO and then admixing. The resultant was poured in a silicone rubber mold and a curing reaction carried out.

EXAMPLE 7

In 10 g of Polymal6304 were dissolved 0.5 g of BP-E, followed by adding thereto 0.04 g of cobalt naphthenate and 0.1 g of MEKPO and then admixing. The resultant was poured in a silicone rubber mold and a curing reaction carried out.

EXAMPLE 8

In 10 g of Polymal6304 were dissolved 1.0 g of BP-E, followed by adding thereto 0.04 g of cobalt naphthenate and 0.1 g of MEKPO and then admixing. The resultant was poured in a silicone rubber mold and a curing reaction carried out.

EXAMPLE 9

To 10 g of Polymal6304 were added 0.04 g of cobalt naphthenate and 0.1 g of MEKPO and then admixed. The resultant was poured in a silicone rubber mold and a curing reaction carried out. After one hour, 10 ml of solution in which 10 ml of styrene dissolved 0.1 g of BP-D was coated to the resulting cured material which is still incomplete in curing, and then the curing reaction was continued.

EXAMPLE 10

To 10 g of Polymal6304 were added 0.04 g of cobalt naphthenate and 0.1 g of MEKPO and then admixed. The resultant was poured in a silicone rubber mold and a curing reaction carried out. After one hour, 10 ml of solution in which 10 ml of toluene dissolved 0.1 g of BP-D was coated to the resulting cured material which is still incomplete in curing, and then the curing reaction was continued.

EXAMPLE 11

To 10 g of Polymal6304 were added 0.04 g of cobalt naphthenate and 0.1 g of MEKPO and then admixed. The resultant was poured in a silicone rubber mold and a curing reaction carried out. After one hour, 10 ml of solution in which 10 ml of styrene dissolved 0.1 g of BP-E was coated to the resulting cured material which is still incomplete in curing, and then the curing reactive was continued.

EXAMPLE 12

To 10 g of Polymal6304 were added 0.04 g of cobalt naphthenate and 0.1 g of MEKPO and then admixed. The resultant was poured in a silicone rubber mold and a curing reaction carried out. After one hour, 10 ml of solution in which 10 ml of toluene dissolved 0.1 g of BP-E was coated to the resulting cured material which is still incomplete in curing, and then the curing reactive was continued.

EXAMPLE 13

To 10 g of Polymal6304 were added 0.04 g of cobalt naphthenate and 0.1 g of MEKPO and then admixed. The resultant was poured in a silicone rubber mold and a curing reaction carried out. After one hour, 10 ml of solution in which 10 ml of toluene dissolved 0.1 g of MAI-10 was coated to the resulting cured material which is still incomplete in curing, and then the curing reactive was continued.

EXAMPLE 14

In 10 g of Polymal6304 were dissolved 0.1 g of BP-B, followed by adding thereto 0.04 g of cobalt naphthenate and 0.1 g of MEKPO and then admixing. The resultant was poured in a silicone rubber mold and a curing reaction carried out.

EXAMPLE 15

In 10 g of Polymal6304 were dissolved 0.5 g of BP-F, followed by adding thereto 0.04 g of cobalt naphthenate and 0.1 g of MEKPO and then admixing. The resultant was poured in a silicone rubber mold and a curing reaction carried out.

EXAMPLE 16

In 10 g of Polymal6304 were dissolved 0.1 g of MAI-3, followed by adding thereto 0.04 g of cobalt naphthenate and 0.1 g of MEKPO and then admixing. The resultant was poured in a silicone rubber mold and a curing reaction carried out.

EXAMPLE 17

In 10 g of Polymal6304 were dissolved 0.1 g of MAI-8, followed by adding thereto 0.04 g of cobalt naphthenate and 0.1 g of MEKPO and then admixing. The resultant was poured in a silicone rubber mold and a curing reaction carried out.

EXAMPLE 18

To 10 g of Polymal6304 were added 0.04 g of cobalt naphthenate and 0.1 g of MEKPO and then admixed. The resultant was poured in a silicone rubber mold and a curing reaction carried out. After one hour, 10 ml of solution in which 10 ml of styrene dissolved 0.1 g of BP-B was coated to the resulting cured material which is still incomplete in curing, and then the curing reactive was continued.

EXAMPLE 19

To 10 g of Polymal6304 were added 0.04 g of cobalt naphthenate and 0.1 g of MEKPO and then admixed. The resultant was poured in a silicone rubber mold and a curing reaction carried out. After one hour, 10 ml of solution in which 10 ml of styrene dissolved 0.1 g of BP-F was coated to the resulting cured material which is still incomplete in curing, and then the curing reactive was continued.

EXAMPLE 20

To 10 g of Polymal6304 were added 0.04 g of cobalt naphthenate and 0.1 g of MEKPO and then admixed. The resultant was poured in a silicone rubber mold and a curing reaction carried out. After one hour, 10 ml of solution in which 10 ml of styrene dissolved 0.1 g of MAI-3 was coated to the resulting cured material which is still incomplete in curing, and then the curing reactive was continued.

EXAMPLE 21

To 10 g of Polymal6304 were added 0.04 g of cobalt naphthenate and 0.1 g of MEKPO and then admixed. The resultant was poured in a silicone rubber mold and a curing reaction carried out. After one hour, 10 ml of solution in which 10 ml of styrene dissolved 0.1 g of MAI-8 was coated to the resulting cured material which is still incomplete in curing, and then the curing reactive was continued.

EXAMPLE 22

To 10 g of Polymal6304 were added 0.04 g of cobalt naphthenate and 0.1 g of MEKPO and then admixed. The resultant was poured in a silicone rubber mold and a curing reaction carried out. After one hour, 10 ml of solution in which 10 ml of styrene dissolved 0.1 g of MAI-10 was coated to the resulting cured material which is still incomplete in curing, and then the curing reactive was continued.

EXAMPLE 23

In 10 g of Polymal6304 were dissolved 0.5 g of MAI-10, followed by adding thereto 0.1 ml of dimethylaniline and 1 g of benzoyl peroxide (hereinafter abbreviated as BPO) and then admixing. The resultant was poured in a silicone rubber mold and a curing reaction carried out.

EXAMPLE 24

In 10 g of Polymal6304 were dissolved 0.5 g of BP-A, followed by adding thereto 0.1 ml of dimethylaniline and 1 g of BPO and then admixing. The resultant was poured in a silicone rubber mold and a curing reaction carried out.

EXAMPLE 25

In 10 g of Polymal6304 were dissolved 0.5 g of BP-E, followed by adding thereto 0.1 ml of dimethylaniline and 1 g of BPO and then admixing. The resultant was poured in a silicone rubber mold and a curing reaction carried out.

EXAMPLE 26

In 10 g of Polymal6304 were dissolved 1.0 g of BP-E, followed by adding thereto 0.1 ml of dimethylaniline and 1 g of BPO and then admixing. The resultant was poured in a silicone rubber mold and a curing reaction carried out.

Comparative Example 1

To 10 g of Polymal6304 were added 0.04 g of cobalt naphthenate and 0.1 g of MEKPO and then admixing. The resultant was poured in a silicone rubber mold and a curing reaction carried out.

Experimental Example 1

Curing Test

On Examples 1 through 26 and Comparative Example 1, the state of curing was observed visually. The results are shown in Table 1.

Evaluation standard:
  ○: cured
  Δ: incompletely cured showing gel state

Experimental Example 2

Contact Angle with Water Test

On Examples 1 through 26 and Comparative Example 1, contact angle with water was measured by means of CONTACT-ANGLE MEASUREMENT APPARATUS (manufactured by Erma Co., Ltd.). The results are shown in Table 1.

TABLE 1

| Example No. | Curing Test | Contact angle with water (average) |
|---|---|---|
| Example 1 | ○ | 79–101° (94°) |
| Example 2 | ○ | 88–101° (96°) |
| Example 3 | ○ | 76–100° (87°) |
| Example 4 | ○ | 99–102° (100°) |
| Example 5 | ○ | 72–77° (74°) |
| Example 6 | ○ | 90–101° (96°) |
| Example 7 | ○ | 94–100° (97°) |
| Example 8 | ○ | 96–99° (97°) |
| Example 9 | ○ | 98–102° (99.9°) |
| Example 10 | ○ | 98–103° (100°) |
| Example 11 | ○ | 100–104° (102°) |
| Example 12 | ○ | 100–104° (101°) |
| Example 13 | ○ | 104–108° (106°) |
| Example 14 | ○ | 96–104° (101°) |
| Example 15 | ○ | 100–102° (101°) |
| Example 16 | ○ | 101–103° (102°) |
| Example 17 | ○ | 100–101° (100°) |
| Example 18 | ○ | 100–102° (101°) |
| Example 19 | ○ | 101–104° (102°) |
| Example 20 | ○ | 99–104° (102°) |
| Example 21 | ○ | 100–102° (100°) |
| Example 22 | ○ | 101–106° (104°) |
| Example 23 | ○ | 109–116° (111°) |
| Example 24 | ○ | 101–103° (102°) |
| Example 25 | ○ | 95–103° (102°) |
| Example 26 | ○ | 100–103° (102°) |
| Comparative Example 1 | ○ | 61.4° |

From the above result, it is understood that the cured materials of unsaturated polyester resin of the present invention in Examples 1 through 26 have higher contact angle to water and therefore higher water-repellent ability than the conventional cured material of unsaturated polyester resin in Comparative Example 1. The cured materials of unsaturated polyester resin of the present invention are thus found to be clearly excellent in this regard as compared with a conventional one.

EXAMPLE 27

In 10 g of Polymal6304 were dissolved 0.1 g of BP-A, followed by adding thereto 0.04 g of cobalt naphthenate and 0.1 g of MEKPO and then admixing. The resin of 1 g of the resultant was coated to an aluminum plate, and another aluminum plate was covered thereon and a weight of 500 g was loaded on the plate, followed by standing overnight to carry out a curing reaction.

EXAMPLE 28

In 10 ml of methyl ethyl ketone (hereinafter abbreviated as MEK) were dissolved 0.5 g of BP-A. The resultant was coated to an aluminum plate by dipping, followed by drying over air to form a coating layer. On the other hand, in 10 g of Polymal6304 were admixed 0.04 g of cobalt naphthenate and 0.1 g of MEKPO. The resin of 1 g of the resultant was coated to the surface of the coated aluminum plate obtained above, and another aluminum plate was covered thereon and a weight of 500 g was loaded on the plate, followed by standing overnight to carry out a curing reaction.

Comparative Example 2

To 10 g of Polymal6304 were added 0.04 g of cobalt naphthenate and 0.1 g of MEKPO, followed by admixing. The resin of 1 g of the resultant was coated to an aluminum plate, and another aluminum plate was covered thereon and a weight of 500 g was loaded on the plate, followed by standing overnight to carry out a curing reaction.

Experimental Example 3
Peeling-off Test (Adhesive Strength Test)

Adhesive strengths of the samples obtained in Examples 27, 28 and Comparative Example 2 were measured after the test of adhesive strength in shear by tension loading in accordance with JIS K 6850. The results are shown in the Table 2.

TABLE 2

| Example No. | Adhesive area (cm$^2$) | Maximum load (KgW) | Adhesive strength (KgW/cm$^2$) |
|---|---|---|---|
| Example 27 | 5.46 | 66.3 | 12.1 |
| Example 28 | 4.67 | 62.7 | 13.4 |
| Comparative Example 2 | 5.26 | 93.2 | 17.7 |

As is clear from the above result, adhesive strengths of Examples 27 and 28 are 31.6% and 24.3%, respectively, lower than that of Comparative Example 2. This means that peeling-off ability to a metal is increased by using the silicone-containing block copolymer used in the present invention.

Though, peeling-off ability has generally been improved by applying a release agent such as silicone oil on a mold upon molding of a polymer, no such release agent is necessary to be used, when the unsaturated polyester resin composition of the present invention is used. The unsaturated polyester resin composition of the present invention is excellent also in this aspect.

EXAMPLE 29

In 10 g of Polymal6304 were dissolved 0.1 g of BP-A, followed by adding thereto 0.04 g of cobalt naphthenate and 0.1 g of MEKPO and then admixing. The resin of 1 g of the resultant was coated to a steel plate, and another steel plate was covered thereon and a weight of 500 g was loaded on the plate, followed by standing overnight to carry out curing reaction.

EXAMPLE 30

In 10 ml of MEK were dissolved 0.5 g of BP-A. The resultant was coated to a steel plate by dipping, followed by drying over air to form a coating layer. On the other hand, in 10 g of Polymal6304 were admixed 0.04 g of cobalt naphthenate and 0.1 g of MEKPO. The resin of 1 g of the resultant was coated to the surface of the coated steel plate obtained above, and another steel plate was covered thereon and a weight of 500 g was loaded on the plate, followed by standing overnight to carry out a curing reaction.

Comparative Example 3

To 10 g of Polymal6304 were added 0.04 g of cobalt naphthenate and 0.1 g of MEKPO, followed by admixing. The resin of 1 g of the resultant was coated to a steel plate, and another steel plate was covered thereon and a weight of 500 g was loaded on the plate, followed by standing overnight to carry out curing reaction.

Experimental Example 4
Transcription Test

On Examples 29, 30 and Comparative Example 3, the adhered materials were peeled off and the surface of the peeled off part of the materials were observed. The results are shown in Table 3.

TABLE 3

| Example No. | Transcription test |
|---|---|
| Example 29 | ○ |
| Example 30 | ○ |
| Comparative Example 3 | X |

○: Rough pattern on the surface of the steel plate is accurately transcribed.
X: Rough pattern on the surface of the steel plate is not accurately transcribed.

As clearly understood, the cured materials of the unsaturated polyester resins of the present invention, in Examples 29 and 30, transcript accurately the rough pattern of the steel plate used as a mold as compared with conventional cured materials of unsaturated polyester resin of Comparative Example 3. The cured materials of the present invention are excellent also in this aspect.

As has been mentioned above, the present invention provides novel cured materials of unsaturated polyester resin which is excellent in water-repellent ability, weathering resistance, chemical resistance, anti-staining ability, adhesive force and the like. Thus, the present invention can contribute to the industry greatly.

What is claimed is:

1. An unsaturated polyester resin composition comprising (a) an unsaturated polyester resin, and (b) a silicone-containing macro-azo-initiator shown by the general formula (1):

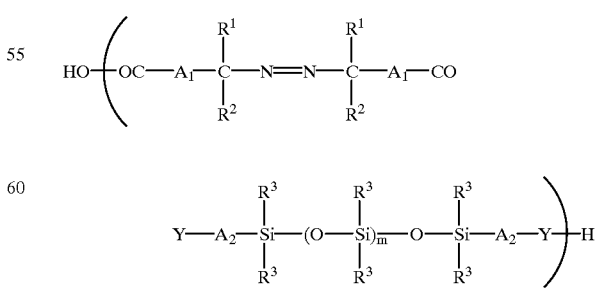

wherein R$^1$ is a lower alkyl group; R$^2$ is a lower alkyl group or a cyano group; A$_1$ is an alkylene group which may contain one or more oxygen atoms(s); $R^3$ is a lower alkyl group or a phenyl group; $A_2$ is a lower alkylene group which may contain one or more oxygen atom(s) and/or aromatic rings (s); Y is —NH— or —O—; m is 0 or a natural number; and n is a natural number, and/or a silicone-containing block copolymer having a repeating unit shown by the general formula (1a):

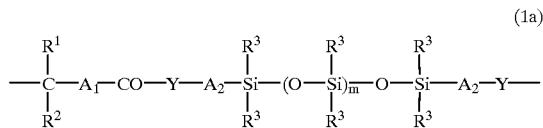

(1a)

wherein $R^1$, $R^2$, $R^3$, $A^1$, $A_2$, Y, and m are as defined above, and a repeating unit shown by the general formula (2a):

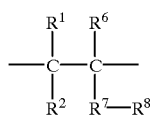

(2a)

wherein $R^4$ is a hydrogen atom, a lower alkyl group or a halogen atom; $R^5$ is a hydrogen atom, a lower alkyl group, a halogen atom, an alkyloxycarbonyl group or a formyl group; $R^6$ is a hydrogen atom, a lower alkyl group, a halogen atom or an alkyloxycarbonyl group; $R^7$ is an alkylene group which may optionally contain double bond(s) or a direct link; and $R^8$ is a hydrogen atom, an alkyl group, a haloalkyl group, an aryl group which may have substituent(s), a halogen atom, an alkyloxycarbonyl group, an aralkyloxycarbonyl group, a hydroxyalkyloxycarbonyl group, an aryloxycarbonyl group, a cyano group, an acyloxy group, a formyl group or a hydroxyl group.

2. The unsaturated polyester resin composition according to claim 1, wherein the silicone-containing block copolymer is one obtained by copolymerizing a silicone-containing macro-azo-initiator shown by the general formula (1):

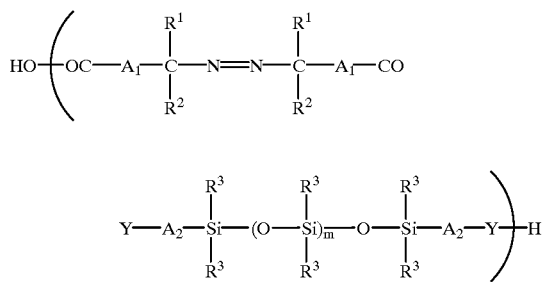

(1)

wherein $R^1$ is a lower alkyl group; $R^2$ is a lower alkyl group or a cyano group; $A_1$ is an alkylene group which may contain one or more oxygen atoms(s); $R^3$ is a lower alkyl group or a phenyl group; $A_2$ is a lower alkylene group which may contain one or more oxygen atom(s) and/or aromatic rings (s); Y is —NH— or —O—; m is 0 or a natural number; and n is a natural number, with a nonionic monomer shown by the general formula (2):

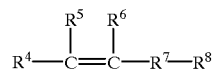

(2)

wherein $R^4$ is a hydrogen atom, a lower alkyl group or a halogen atom; $R^5$ is a hydrogen atom, a lower alkyl group, a halogen atom, an alkyloxycarbonyl group or a formyl group; $R^6$ is a hydrogen atom, a lower alkyl group, a halogen atom or an alkyloxycarbonyl group; $R^7$ is an alkylene group which may optionally contain double bond(s) or a direct link; and $R^8$ is a hydrogenatom, an alkyl group, a haloalkyl group, an aryl group which may have substituent(s), a halogen atom, an alkyloxycarbonyl group, an aralkyloxycarbonyl group, a hydroxyalkyloxycarbonyl group, an aryloxycarbonyl group, a cyano group, an acyloxy group, a formyl group or a hydroxyl group.

3. A method for preparation of cured materials of unsaturated polyester resin composition containing a siloxane part in a surface layer, which comprises curing the unsaturated polyester resin composition as claimed in claim 1 or 2.

4. A method for preparation of cured materials of unsaturated polyester resin composition containing a siloxane part in a surface layer, which comprises allowing unsaturated polyester resin to contact with a silicone-containing macro-azo-initiator shown by the general formula (1):

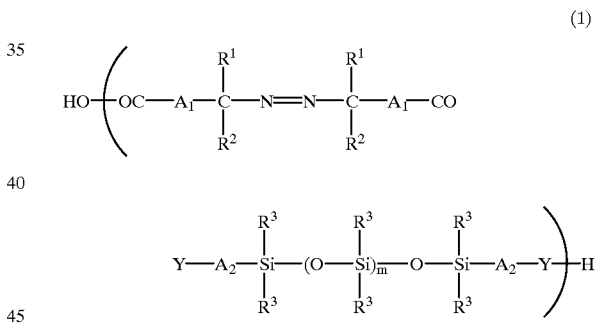

(1)

wherein $R^1$ is a lower alkyl group; $R^2$ is a lower alkyl group or a cyano group; $A_1$ is an alkylene group which may contain one or more oxygen atoms(s); $R^3$ is a lower alkyl group or a phenyl group; $A_2$ is a lower alkylene group which may contain one or more oxygen atom(s) and/or aromatic rings (s); Y is —NH— or —O—; m is 0 or a natural number; and n is a natural number, and/or a silicone-containing block copolymer having a repeating unit shown by the general formula (1a):

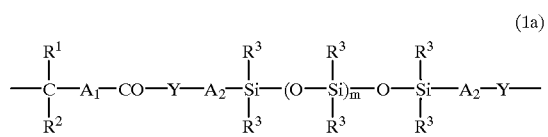

(1a)

wherein $R_1$, $R_2$, $R_3$, $A_1$, $A_2$, Y, and m are as defined above, and a repeating unit shown by the general formula (2a):

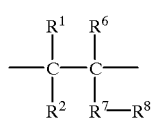
(2a)

wherein $R^4$ is a hydrogen atom, a lower alkyl group or a halogen atom; $R^5$ is a hydrogen atom, a lower alkyl group, a halogen atom, an alkyloxycarbonyl group or a formyl group; $R^6$ is a hydrogen atom, a lower alkyl group, a halogen atom or an alkyloxycarbonyl group; $R^7$ is an alkylene group which may optionally contain double bond(s) or a direct link; and $R^8$ is a hydrogen atom, an alkyl group, a haloalkyl group, an aryl group which may have substituent(s), a halogen atom, an alkyloxycarbonyl group, an aralkyloxycarbonyl group, a hydroxyalkyloxycarbonyl group, an aryloxycarbonyl group, a cyano group, an acyloxy group, a formyl group or a hydroxyl group, and allowing a curing reaction to take place.

5. A method for preparation of cured materials of unsaturated polyester resin composition containing a siloxane part in a surface layer, which comprises starting a curing reaction of unsaturated polyester resin composition, then allowing the surface of the unsaturated polyester resin to contact with a silicone-containing macro-azo-initiator shown by the general formula (1):

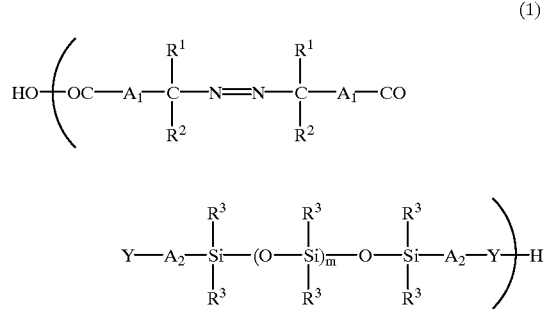
(1)

wherein $R^1$ is a lower alkyl group; $R^2$ is a lower alkyl group or a cyano group; $A_1$ is an alkylene group which may contain one or more oxygen atoms(s); $R^3$ is a lower alkyl group or a phenyl group; $A_2$ is a lower alkylene group which may contain one or more oxygen atom(s) and/or aromatic rings (s); Y is —NH— or —O—; m is 0 or a natural number; and n is a natural number, and/or a silicone-containing block copolymer having a repeating unit shown by the general formula (1a):

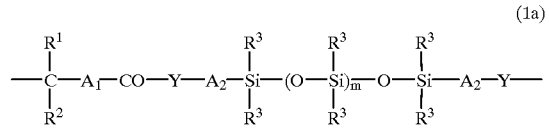
(1a)

wherein $R^1$, $R^2$, $R^3$, $A_1$, $A_2$, Y, and m are as defined above and a repeating unit shown by the general formula (2a):

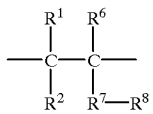
(2a)

wherein $R^4$ is a hydrogen atom, a lower alkyl group or a halogen atom; $R^5$ is a hydrogen atom, a lower alkyl group, a halogen atom, an alkyloxycarbonyl group or a formyl group; $R^6$ is a hydrogen atom, a lower alkyl group, a halogen atom or an alkyloxycarbonyl group; $R^7$ is an alkylene group which may optionally contain double bond(s) or a direct link; and $R^8$ is a hydrogen atom, an alkyl group, a haloalkyl group, an aryl group which may have substituent(s), a halogen atom, an alkyloxycarbonyl group, an aralkyloxycarbonyl group, a hydroxyalkyloxycarbonyl group, an aryloxycarbonyl group, a cyano group, an acyloxy group, a formyl group or a hydroxyl group during the curing reaction, and continuing the curing reaction to completion.

6. A method according to claim 4 or 5, wherein the silicon-containing block copolymer is one obtained by copolymerizing a silicon-containing macro-azo-initiator shown by the general formula (1):

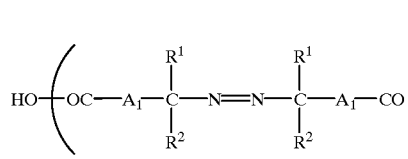
(1)

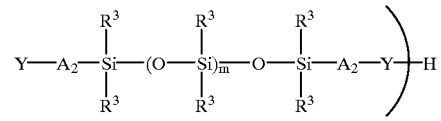

wherein $R^1$ is a lower alkyl group; $R^2$ is a lower alkyl group or a cyano group; $A_1$ is an alkylene group which may contain one or more oxygen atoms(s); $R^3$ is a lower alkyl group or a phenyl group; $A_2$ is a lower alkylene group which may contain one or more oxygen atom(s) and/or aromatic rings (s); Y is —NH— or —O—; m is 0 or a natural number; and n is a natural number, with a nonionic monomer shown by the general formula (2):

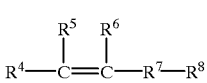
(2)

wherein $R^4$ is a hydrogen atom, a lower alkyl group or a halogen atom; $R^5$ is a hydrogen atom, a lower alkyl group, a halogen atom, an alkyloxycarbonyl group or a formyl group; $R^6$ is a hydrogen atom, a lower alkyl group, a halogen atom or an alkyloxycarbonyl group; $R^7$ is an alkylene group which may optionally contain double bond(s) or a direct link; and $R^8$ is a hydrogen atom, an alkyl group, a haloalkyl group, an aryl group which may have substituent(s), a halogen atom, an alkyloxycarbonyl group, an aralkyloxycarbonyl group, a hydroxyalkyloxycarbonyl group, an aryloxycarbonyl group, a cyano group, an acyloxy group, a formyl group or a hydroxyl group.

7. Cured materials of unsaturated polyester resin composition, which contain a silicone-containing compound having a repeating unit shown by the general formula (1a):

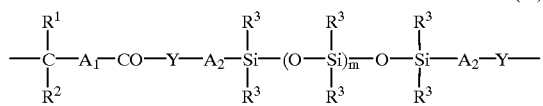 (1a)

wherein $R^1$ is a lower alkyl group; $R^2$ is a lower alkyl group or a cyano group; $A_1$, is an alkylene group which may contain one or more oxygen atom(s); $R^3$ is a lower alkyl group or a phenyl group; $A_2$ is a lower alkylene group which may contain one or more oxygen atom(s) and/or aromatic ring(s); Y is —NH— or —O—; and m is 0 or a natural number and a siloxane part of the silicone-containing compound is present mainly in a surface layer.

8. Cured materials of unsaturated polyester resin composition obtained by the method according to claim 4 or 5, which contain a siloxane part which is derived from the silicon-containing macro-azo-initiator shown by the general formula (1) and/or silicone-containing block polymer having a repeating unit shown by the general formula (1a) in a surface layer.

* * * * *